US012664153B2

(12) United States Patent
Singh et al.

(10) Patent No.: US 12,664,153 B2
(45) Date of Patent: Jun. 23, 2026

(54) SYSTEMS AND METHODS OF VISUALIZING DATA IN A CELLULAR NETWORK

(71) Applicant: RAKUTEN MOBILE, INC., Tokyo (JP)

(72) Inventors: Abhishek Singh, San Mateo, CA (US); Anshul Bhatt, Tokyo (JP); Karan Arora, Madhya Pradesh (IN); Kunal Khanwilkar, San Mateo, CA (US); Rahul Atri, Singapore (SG); Alok Singh Pawar, Madhya Pradesh (IN); Rahul Gupta, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 361 days.

(21) Appl. No.: 17/760,305

(22) PCT Filed: May 19, 2022

(86) PCT No.: PCT/US2022/029950
§ 371 (c)(1),
(2) Date: Aug. 8, 2022

(87) PCT Pub. No.: WO2023/224620
PCT Pub. Date: Nov. 23, 2023

(65) Prior Publication Data
US 2024/0202186 A1     Jun. 20, 2024

(51) Int. Cl.
*G06F 16/20* (2019.01)
*G06F 16/242* (2019.01)
(Continued)

(52) U.S. Cl.
CPC ........ *G06F 16/2428* (2019.01); *G06F 16/248* (2019.01); *H04L 41/22* (2013.01)

(58) Field of Classification Search
CPC .......................... G06F 16/2428; G06F 16/248
(Continued)

(56) References Cited

U.S. PATENT DOCUMENTS 7,603,408 B1 * 10/2009 McGinnis ............. H04W 12/03
                                                              709/245
10,394,802 B1 * 8/2019 Porath ................... G06F 16/906
(Continued)

FOREIGN PATENT DOCUMENTS

EP            3611957 A1    2/2020
WO       WO2023224620    * 11/2023

OTHER PUBLICATIONS

Shirazi et al., A Qos Monitoring System in an Heterogenous Multi-Domain DVB-H Platform, IEEE 2009.*

*Primary Examiner* — Daniel A Kuddus
(74) *Attorney, Agent, or Firm* — HAUPTMAN HAM, LLP

(57) ABSTRACT

Systems and methods of obtaining data from a cellular network are disclosed. In some embodiments, visual query options are presented in a graphical user interface (GUI), wherein the visual query options define a query. Query option selections of the visual query options are received. A query template is generated in accordance with the query option selections. An audit of parameters is performed related with network elements of the cellular network in accordance with the query template. A report of the audit is transmitted to a user device. A visual representation of the report is presented in the GUI.

20 Claims, 13 Drawing Sheets

(51) Int. Cl.
    *G06F 16/248*          (2019.01)
    *H04L 41/22*          (2022.01)

(58) Field of Classification Search
    USPC .......................................................... 707/722
    See application file for complete search history.

(56)                 References Cited

U.S. PATENT DOCUMENTS

| | | | |
|---|---|---|---|
| 2002/0123339 A1* | 9/2002 | Boehmke .............. | G06Q 10/06 |
| | | | 455/446 |
| 2012/0102543 A1* | 4/2012 | Kohli ..................... | H04L 63/20 |
| | | | 726/1 |
| 2015/0212663 A1 | 7/2015 | Papale et al. | |
| 2020/0167350 A1* | 5/2020 | Miller ................... | G06F 16/248 |

* cited by examiner

301

700

Type

| Query Name | Query Type | Domain | Vendor |
| Example Query | Database | RAN | Vendor 1 |
| Technology | Query Category | Network Type | Bandwidth |
| LTE | New Cat | Marco | TwentyMHZ |

Nodes

| Equipment Type | Software |
| Cell | R4_2.1 |
| NE Name | |
| - | |

Selected Parameters

| Sr.No | Parameters | Operator | Value | Condition | Identifiers |
|---|---|---|---|---|---|
| 1 | Service Based HO | = | Disabled | OR | ≡ |

Previous    Cancel    Submit

Harmony

≡ Network Tree> UHN1OSK100400163-Configuration Details

Search    Configuration Details ∨

Displaying 517 of 517

| NE Name | eNodeB ID | Parameter Type | Equipment Type | Category | Parameter | X Path | Current Value | |
|---|---|---|---|---|---|---|---|---|
| UHN1OSK100400163 | 442537 | GOLDEN | MACRO_ENB | QCIProfiles(profiled=6) | Priority | /bulkCmConfigDataFi... | 6 | ⓘ |
| UHN1OSK100400163 | 442537 | GOLDEN | MACRO_ENB | LTEBaseband(through... | PLMN Whitelist | /bulkCmConfigDataFi... | 44050 | ⓘ |
| UHN1OSK100400163 | 442537 | GOLDEN | MACRO_ENB | QCIProfiles(profiled=7) | ROHC Enable | /bulkCmConfigDataFi... | Disabled | ⓘ |
| UHN1OSK100400163 | 442537 | GOLDEN | MACRO_ENB | QCIProfiles(profiled=1) | RLC Mode | /bulkCmConfigDataFi... | um-bi | ⓘ |
| UHN1OSK100400163 | 442537 | GOLDEN | MACRO_ENB | QCIProfiles(profiled=9) | Logical Channel UL Bu... | /bulkCmConfigDataFi... | ms300 | ⓘ |
| UHN1OSK100400163 | 442537 | GOLDEN | MACRO_ENB | QCIProfiles(profiled=5) | IP V1 Profile | /bulkCmConfigDataFi... | Disabled | ⓘ |
| UHN1OSK100400163 | 442537 | GOLDEN | MACRO_ENB | QCIProfiles(profiled=3) | ESP V1 Profile | /bulkCmConfigDataFi... | Disabled | ⓘ |
| UHN1OSK100400163 | 442537 | GOLDEN | MACRO_ENB | QCIProfiles(profiled=1) | RTP V2 Profile | /bulkCmConfigDataFi... | Disabled | ⓘ |
| UHN1OSK100400163 | 442537 | GOLDEN | MACRO_ENB | QCIProfiles(profiled=2) | Partial Handover Allo... | /bulkCmConfigDataFi... | Enabled | ⓘ |
| UHN1OSK100400163 | 442537 | GOLDEN | MACRO_ENB | QCIProfiles(profiled=4) | ESP V2 Profile | /bulkCmConfigDataFi... | Disabled | ⓘ |

FIG. 9

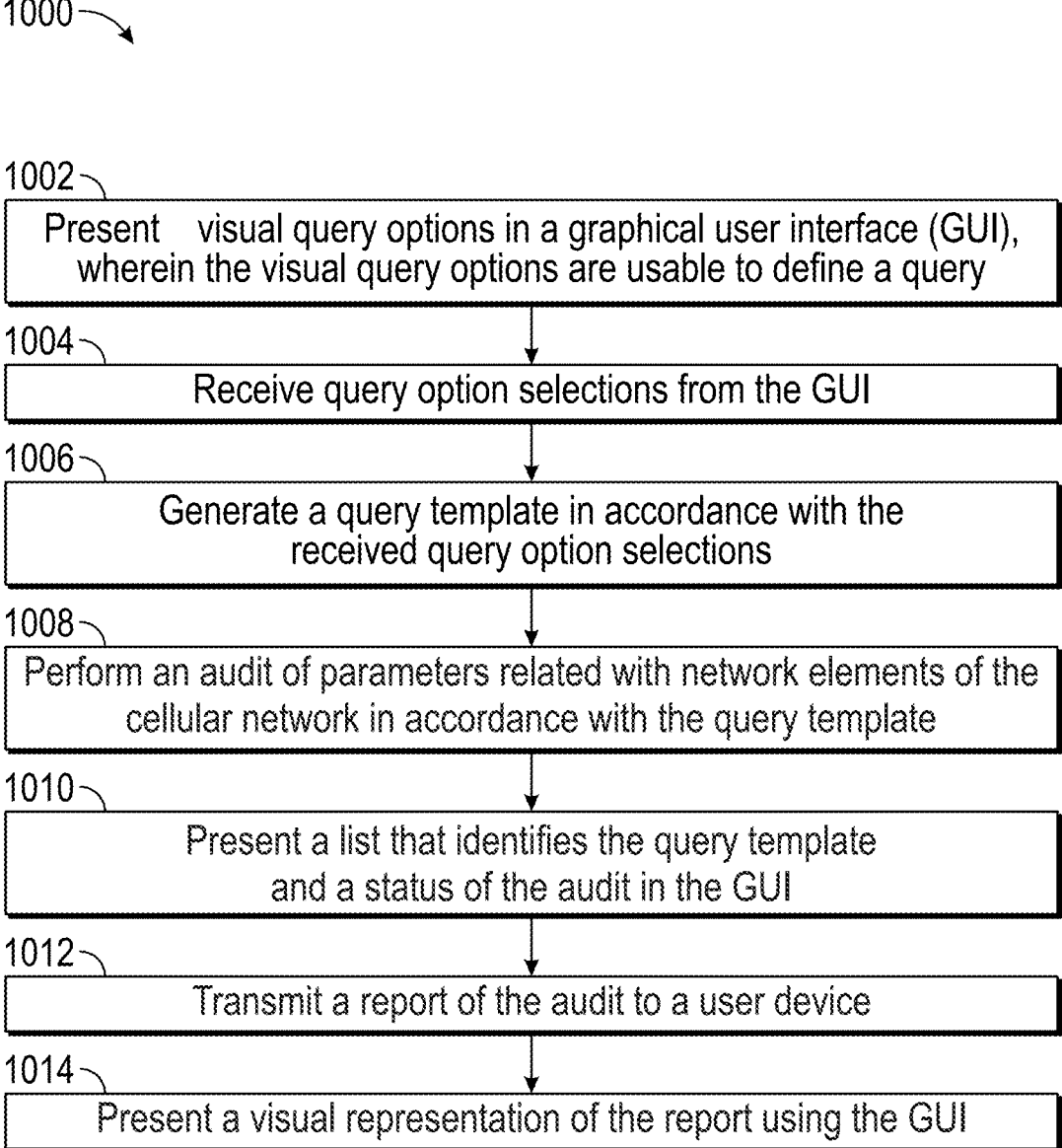

1000

1002
Present visual query options in a graphical user interface (GUI), wherein the visual query options are usable to define a query 1004
Receive query option selections from the GUI 1006
Generate a query template in accordance with the received query option selections 1008
Perform an audit of parameters related with network elements of the cellular network in accordance with the query template 1010
Present a list that identifies the query template and a status of the audit in the GUI 1012
Transmit a report of the audit to a user device 1014
Present a visual representation of the report using the GUI

Figure 11:
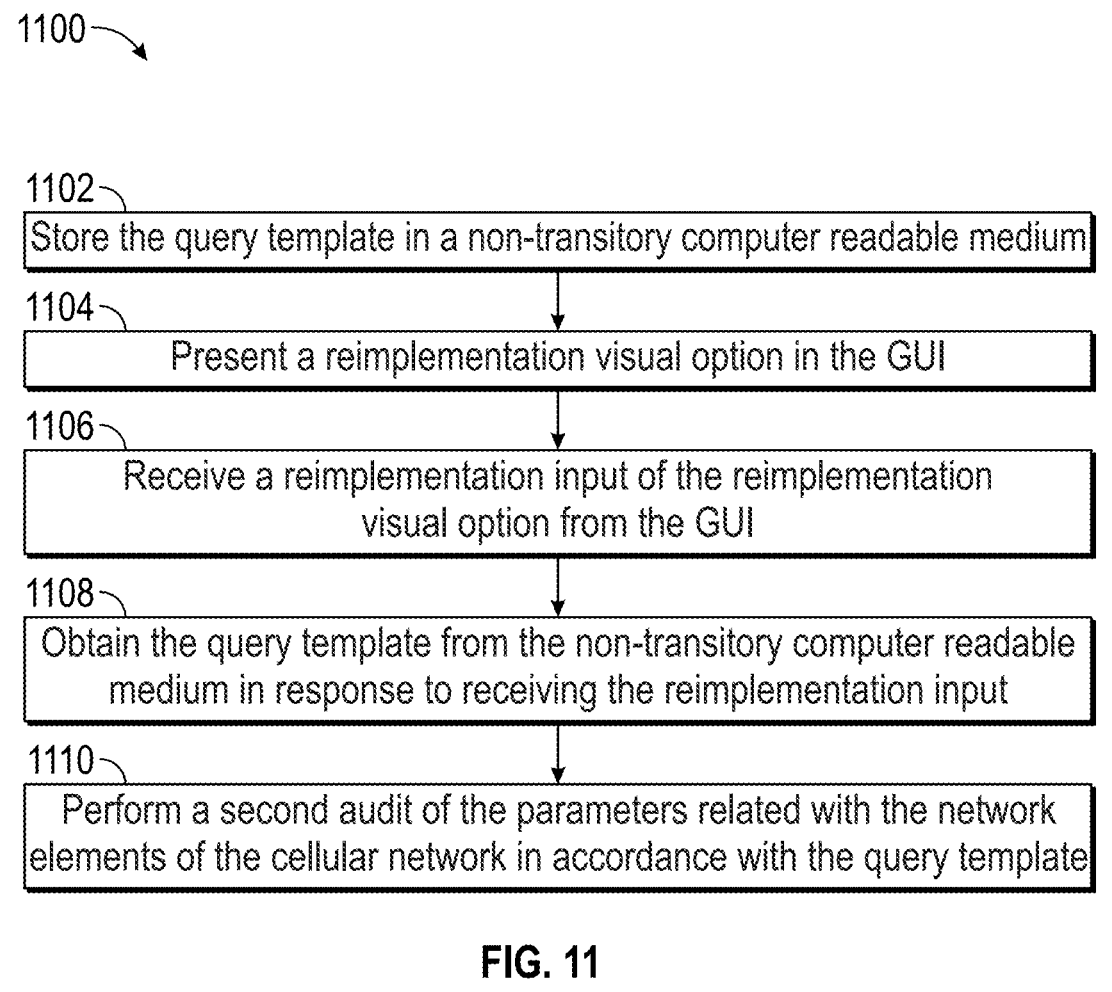

1102 ⟍
Store the query template in a non-transitory computer readable medium

1104 ⟍
Present a reimplementation visual option in the GUI

1106 ⟍
Receive a reimplementation input of the reimplementation
visual option from the GUI 1108 ⟍
Obtain the query template from the non-transitory computer readable
medium in response to receiving the reimplementation input 1110 ⟍
Perform a second audit of the parameters related with the network
elements of the cellular network in accordance with the query template

Receiving second query option selections that
redefine at least a portion of the query

1204 ⟍

Modify the query template in accordance with the second query option selections

1206 ⟍

Performing the second audit of the parameters related with the network
elements of the cellular network in accordance with the modified query template

1300

1302
Transmit a query creation request with the query option
selections to a query builder application 1304
Obtain network element data related to the query option selections 1306
Produce the query template based on the network element data

SYSTEMS AND METHODS OF VISUALIZING DATA IN A CELLULAR NETWORK

RELATED APPLICATIONS

The present application is a National Phase of International Application No. PCT/US2022/029950, filed May 19, 2022.

BACKGROUND

To obtain data from network elements in a cellular network, a user learns the routing and setup of the cellular network in order to route the appropriate queries and obtain the appropriate information. The user enters the routing information manually in order to find the information. The user also uses the knowledge learned about the cellular network to execute tasks in the cellular network once the data is obtained. The user manipulates the system by entering instructions manually in order to have the system perform these tasks.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a visual representation of a query template, in accordance with some embodiments.

FIG. 9 is a visual representation of a report of an audit, in accordance with some embodiments.

FIG. 10 is a flowchart of a method of visualizing data in a cellular network in accordance with some embodiments.

FIG. 11 is a flowchart for reusing a query template to obtain a second report of an audit in accordance with some embodiments.

DETAILED DESCRIPTION

Figure 1:
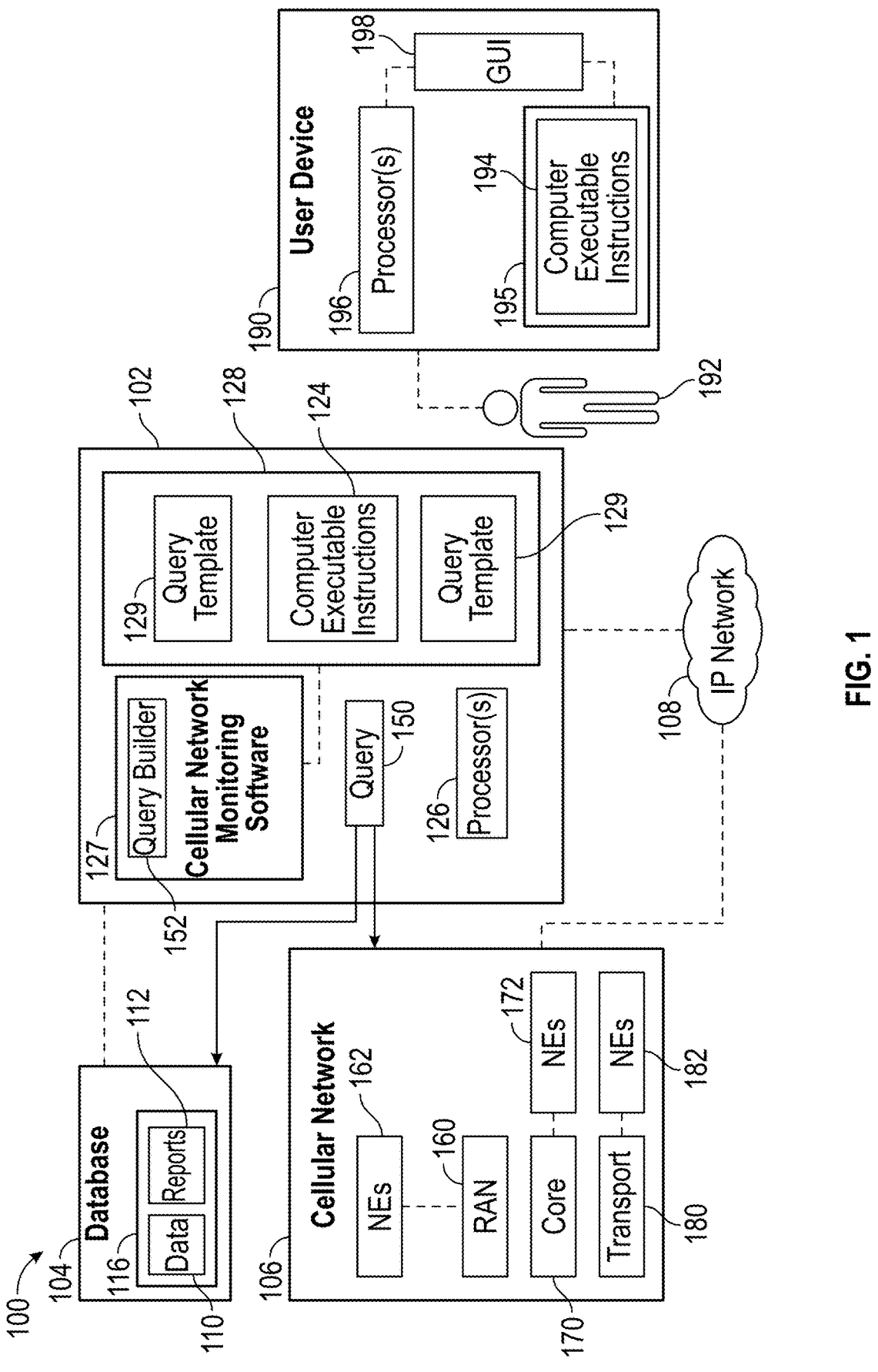
FIG. 1 is a block diagram of a network system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

(Optional, use when applicable) Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and method of visualizing data on a cellular network are disclosed. These systems are configured to search for values for parameters of network elements on a cellular network in an automated manner. Query templates are created using inputs received via a graphical user interface (GUI). In some embodiments, the query templates are generated by a query builder that is configured to generate the queries based on stored network element data from the cellular network. Queries are made to obtain data from the cellular network so that an audit is performed. A report of the audit is then sent to user devices and presented on the GUI. Query templates are reused, in some embodiments, so that more audits are performed based on the query template. This query is made to a database with historical parameter values as a periodic query or to live network, in accordance with some embodiments. In some embodiments, the user does not have to have knowledge of complex output file or a configuration file. Instead, a user makes a query template, based on the provided set of inputs from the GUI and the user obtains the network element data.

FIG. 1 is a block diagram of a network system 100, in accordance with some embodiments.

The network system 100 includes a cellular network monitoring device 102, at least one database 104, and a cellular network 106. Cellular network monitoring device 102 and the cellular network 106 are connected to each other through an internet protocol (IP) network 108. In some embodiments, the IP network 108 includes a wide area network (WAN) (i.e., the internet), a local area network (LAN), a wide area local area network (WLAN), and/or the like. In some embodiments, the cellular network 106 includes a wireless WAN (WWAN).

The cellular network 106 includes a radio access network (RAN) 160. The RAN 160 is the radio element of the cellular network 106. The RAN 160 includes NEs 162, such as base stations that include one or more radio transceivers. The base stations cover land areas called cells. User equipment, such as cell phones, smartphones, laptops, etc., connect to each of the base stations that cover the cells. RAN 160 connects to the core 170 through back haul links.

The core 170 is a central part of the overall cellular network 106. The core 170 allows mobile subscribers to access to services (e.g., international calling, text messaging, local cellular calls). In some embodiments, the core 170 is responsible for critical functions, such as maintaining sub- scriber profile information, subscriber location, authentica- tion of services, and the necessary switching functions for voice and data sessions. The core 170 includes NEs 172. In some embodiments, the NEs 172 include a Mobility Man- agement Entity (MME), a Serving Gateway 166, a Multi- media Broadcast Multicast Service (MBMS) Gateway, a Broadcast Multicast Service Center (BM-SC), and a Packet Data Network (PDN) Gateway. In some embodiments, the MME is in communication with a Home Subscriber Server (HSS). The MME is the control node that processes the signaling between the user equipment and the core 170. Generally, the MME provides bearer and connection man- agement. In some embodiments, Internet protocol (IP) pack- ets are transferred through a serving gateway 166, which itself is connected to the IP network 108.

The transport 180 refers to the transport network that connects the core 170 and the RAN 160 of the cellular network 106. The transport 180 includes NEs 182, such as backhaul links, connectors, relays, Voice over IP devices, etc. In some embodiments, the transport 180 includes a fronthaul that connects macrocells to the small cells, radio units, digital units and/or the like. In some embodiments, the RAN 160, the core 170, and the transport 180 are referred to as different domains of the cellular network 106.

The cellular network monitoring device 102 (server 102 in some embodiments) is a computer device that includes at least one processor 126 and a non-transitory computer readable medium 128. The non-transitory computer readable medium 128 stores computer executable instructions 124. In some embodiments, non-transitory computer readable medium 128 include a random-access memory (RAM), a read-only memory (ROM), an electrically erasable program- mable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. When the processor 126 executes the computer executable instructions 124, the processor 126 executes the cellular network moni- toring software 127.

The cellular network monitoring software 127 is config- ured to visualize the network element data 110 in the cellular network 106. The cellular network monitoring software 127 is configured to capture values of parameters from the cellular network 106 and store the parameters as the network element data 110 in a non-transitory computer readable medium 116 within the database 104. The parameters are captured from the NEs 162, 172, 182 in the different domains of the cellular network 106. The cellular network monitoring software 127 is configured to generate a graphi- cal user interface (GUI) 198 that allows a user on a user device 190 to visualize the network element data 110. Accordingly, rather than having a user searching through the cellular network 106 based on personal knowledge of the cellular network 106, which is a time consuming task, the cellular network monitoring software 127 provides the capa- bility to easily monitor the parameters from the NEs 162, 172, 182 in the different domains of the cellular network 106.

The cellular network monitoring software 127 is config- ured to present the visual query options to define a query using the GUI 198. The cellular network monitoring soft- ware 127 is configured to receive the query option selections of the visual query options and generate a query template 129 in accordance with the query option selections. Audits of parameters related with the NEs 162, 172, 182 of the cellular network 106 are performed in accordance with the query templates 129. In some embodiments, the cellular network monitoring software 127 includes a query builder 152 configured to generate the query template 129 from the query option selections. The cellular network monitoring software 127 is configured to generate a query 150 based on the query template 129. The query builder 152 is configured to create the query template 129, which includes scheduling of an implementation of the query 150 as an instance of the query template 129. Further, a user 192 inputs values for parameters and identifiers related to the query template 129 are selected and input through the GUI 198 shown on the user device 190 in order to generate a query 150 from the query template 129. Through user selections and inputs, the query 150 is scheduled. In some embodiments, an output file with the results of the query 150 is generated and transmitted to the user device 190. In this manner, audits are performed by the cellular network monitoring software 127 on param- eters related to the NEs 162, 172, 182 of the cellular network 106 in accordance with the query template 129.

The query template 129 is saved so that additional queries are made based on the query template 129 later. In some embodiments, the query template 129 includes schedule data that defines a schedule for performing the query 150 defined by the query template 129 in accordance with a schedule. For example, in some embodiments, a query 150 is run in accordance with a query template 129, once a week, once month, or once a year. The cellular network monitoring software 127 also is configured so that the query template 129 is modified through the GUI 198. In this manner, the modified query template 129 is used to generate queries 150.

In some embodiments, the visual query options in the GUI 198 includes selections to specify different network charac- teristics such as domain, vendor, service provider, and technology, geographical area, device type, and the like. In some embodiments, the cellular network monitoring soft- ware 127 transmits one or more queries 150 for parameters in accordance with the query template 129 in order to perform the audit. In some embodiments, the queries 150 are transmitted by the cellular network monitoring software 127 to the database 104 to obtain the historical values of the parameters from the network element data 110. In some embodiments, the queries 150 are transmitted by the cellular network monitoring software 127 directly to specific NEs 162, 172, 182 to obtain the values of the parameters in real time. In some embodiments, the query template 129 defines the NEs 162, 172, 182 in the cellular network 106 from which to receive the parameters. The queries 150 for the parameters are transmitted so that the parameters are cap- tured from the NEs 162, 172, 182 as defined in the query template 129. In some embodiments, the parameters are utilized to troubleshoot one or more of the NEs 162, 172, 182 based on the results of the query 150. For example, the configured values obtained as a result of the query 150 are used to implement other software tools where the user 192 changes parameter values related to one or more of the NEs 162, 172, 182 the parameter values in order to resolve problems in the network 106.

In some embodiments, the query template 129 includes a network location of the parameters that are to be captured and/or obtained, the time slots for capturing and/or obtaining the parameters, the NEs 162, 172, 182 related to the parameters, routing data for finding the parameters, and the like. In some embodiments, the values of the parameters are captured in real-time directly from the NEs 162, 172, 182. As such, in situations where the capturing is done in real-time, the query template 129 includes routing data for capturing values for the parameters directly from the NEs 162, 172, 182.

The cellular network monitoring software 127 is configured to generate and transmit a report 112 of the audit to the user device 190. The report 112 includes values of the parameters that were obtained in accordance with the query template 129. Once the report 112 is obtained by the user device, the cellular network monitoring software 127 is configured to present a visual representation of the report using the GUI 198. In some embodiments, the GUI presents panels with visual representations of the parameters along with details regarding the NEs 162, 172, 182 from which the value of the parameters was captured. In some embodiments, audits are run periodically either in real time or scheduled for future time slots. In some embodiments, several other operations are provided through the GUI 198 including changing parameter values for particular NEs 162, 172, 182, configuration change history for the NEs 162, 172, 182, configuration audit information for the NEs 162, 172, 182, layer view, and options related to roll back to base configuration.

The user device 190 is configured to communicate with the cellular network monitoring software 127 through the IP network 108. The user device 190 includes one or more processors 196 and computer executable instructions 194 that are stored on a non-transitory computer-readable medium 195. In some embodiments, non-transitory computer-readable medium 195 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. Examples of a user devices 190 include a cellular phone, a smart phone, a desktop, a session initiation protocol (SIP) phone, a laptop, a smart watch, a personal digital assistant (PDA), a satellite radio, a global positioning system, a multimedia device, a video device, a game console, a tablet, a smart device, and a wearable communication device. When the computer executable instructions are implemented by the processors 196, the processors 196 are configured to generate and implement the functionality of the GUI 198.

Figure 2:
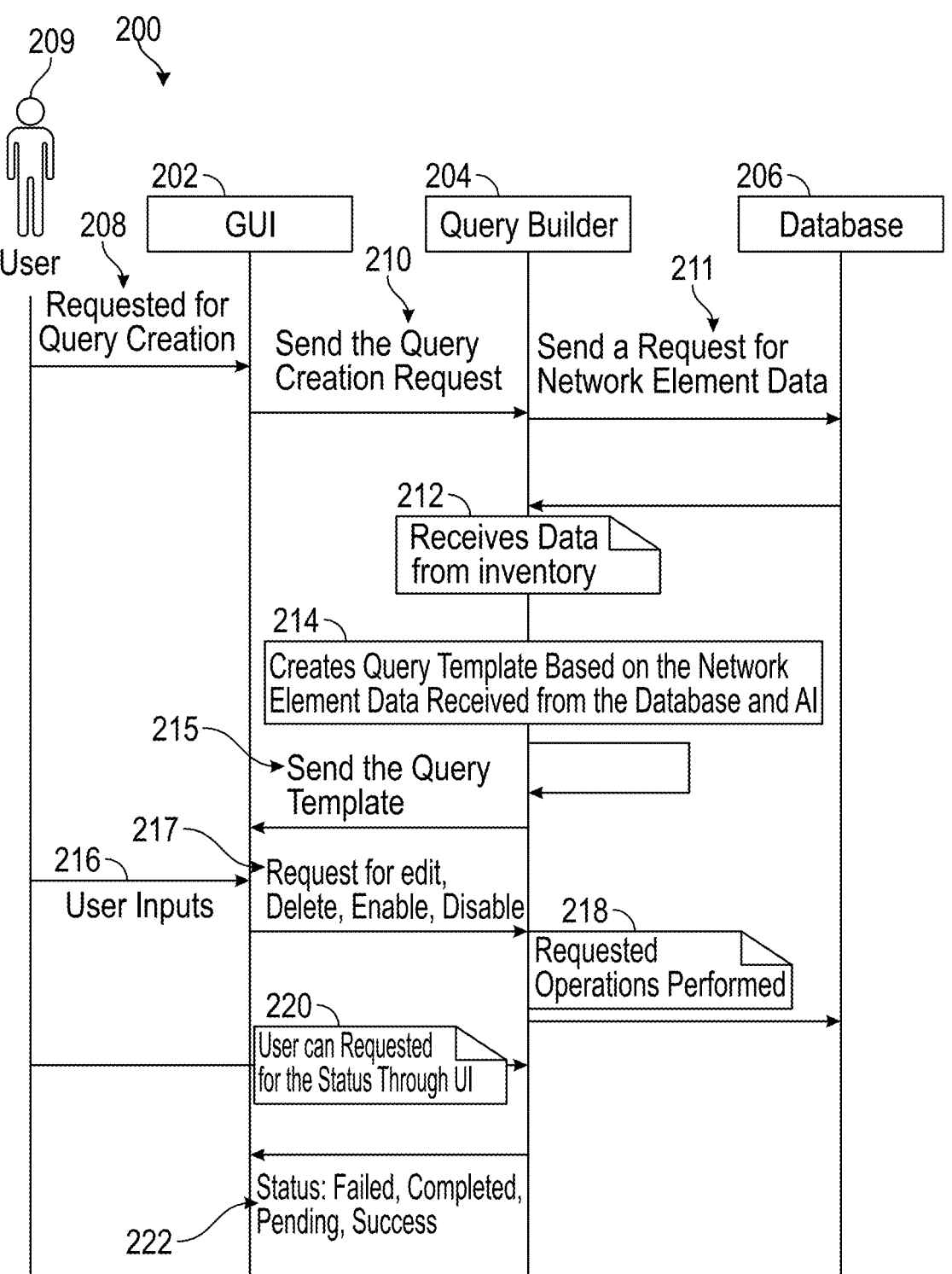
FIG. 2 is a call diagram that relates to a method of generating, manipulating, and maintaining a query template, in accordance with some embodiments.

FIG. 2 is a call diagram 200 that relates to a method of generating, manipulating, and maintaining a query template, in accordance with some embodiments.

An example of the query template generated from the call diagram 200 are the query templates 129 shown in FIG. 1. The process is performed through a GUI 202, a query builder 204, and a database 206. The GUI 202 is an example of the GUI 198 in FIG. 1. The query builder 204 is an example of the query builder 152 in FIG. 1. The database 206 is an example of the database 104 in FIG. 1.

Call diagram 200 includes blocks 208-222. At block 208, query option selections are received from a user 209 through the GUI 198 where the GUI 198 generates a query creation request with the query option selections. At block 210, the query creation request is sent from the GUI 198 to the query builder 204. At block 211, the query builder 204 sends a request for network element data related to the query creation request to the database 206. In some embodiments, the query builder 204 is requesting values for parameters which are configured in the network 106. This results in the generation of the query based on some inputs from the user 209 from GUI 202. In some embodiments, the user 209 selects the domain, vendor, technology type, geography area and then user 209 selects the parameters whose values the user 209 wants to check in the network 106. The user 209 applies conditions to some parameters, which are included in the query 150 in accordance with some embodiments.

At block 212, the database 206 sends the requested network request data to the query builder 204. At block 214, the query builder is configured to create a query template based on the network element data received from the database and artificial intelligence (AI). In some embodiments, the query template fetches the network element data from a dump file kept in a database. In some embodiments, the network element data which is fetched daily from the network. In some embodiments, a GUI interface is provided to a user from a user device where a user logins in to create the query template and schedule a query based on the query template to fetch the network element data from the network. In some embodiments, the query is a Live query search.

At block 215, the query template is sent to the GUI 202. At block 216, user inputs are input into the GUI 202 by the user 209 with changes to the query template. At block 217, the GUI 202 sends requests to the query builder to edit, delete, enable or disable the query template. At block 218, the query builder 204 sends a query to the database 206 requesting that the operations defined by the query be performed. At block 220, the user 209, through the GUI 202, sends a request for the status of the query. At block 222, the query builder 204 sends status data to the GUI 202. The status data indicates whether the query has failed, is complete, is pending, or was a success.

Figure 3:
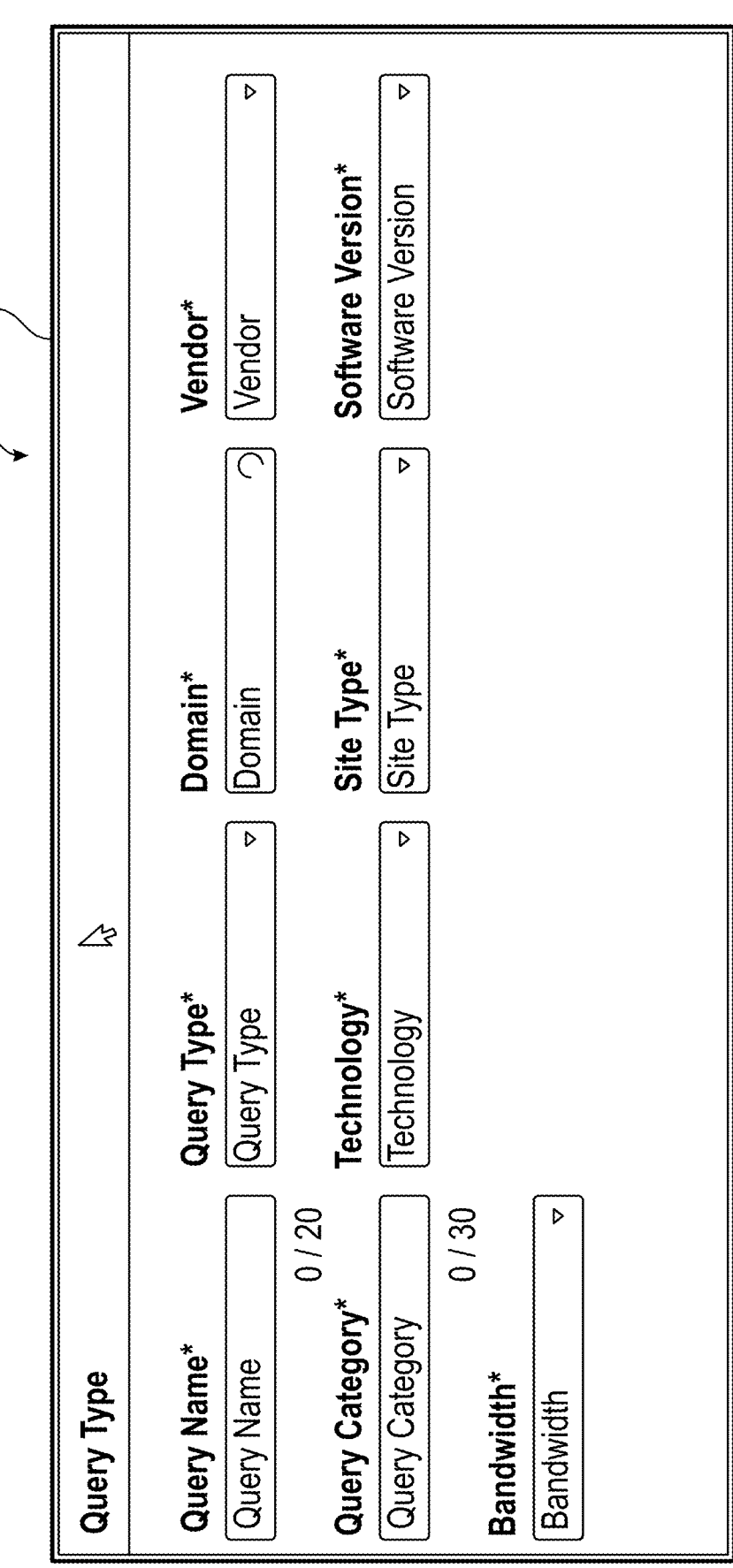
FIG. 3 is a view of a panel in a GUI, in accordance with some embodiments.

FIG. 3 is a view of a panel 300 in a GUI 301, in accordance with some embodiments.

The panel includes visual query options related to defining a query type. The visual query options include visual query options named "Query Name," "Query Type", "Domain," "Vendor," "Query Category," "Technology", "Site Type," "Software Version," and "Bandwidth." The visual query option named "Query Name" is configured to receive a query name selection from a user. The visual query option named "Query Type" is configured to receive a query type selection of either database for historical parameter values or live for parameter values obtained in real-time from the cellular network 106. The visual query option named "Domain" is configured to receive a domain selection from a user of either the RAN, Core, or Transport. The visual query option named "Vendor" is configured to receive a vendor selection from a user regarding NEs. The visual query option named "Query Category" is configured to receive a query category selection from a user for the query. The visual query option named "Technology" is configured to receive a technology selection from a user, such as 3G, 4G, LTE, or 5G. The visual query option named "Site Type" is configured to receive a site type selection such as Macro or RUID from a user. The visual query option named "Software Version" is configured to receive a software version selection that identifies a software version that is being implemented by the network elements. The visual query option named "Bandwidth" is configured to receive a bandwidth selection that identifies a bandwidth range for signals being transmitted by the network elements.

Upon receiving one or more of the query selections above, a query builder 152 is configured to generate a query template 129 (See FIG. 1) in accordance with the query selections. In some embodiments, the query builder 152 (See FIG. 1) is configured to generate the query template 129 in accordance with FIG. 2. In some embodiments, the query template 129 is then stored in the non-transitory computer readable storage medium 128 (See FIG. 1) of the cellular network monitoring device 102 (See FIG. 1) or the non-transitory computer readable medium 116 (See FIG. 1) of the database 104 (See FIG. 1).

Figure 4:
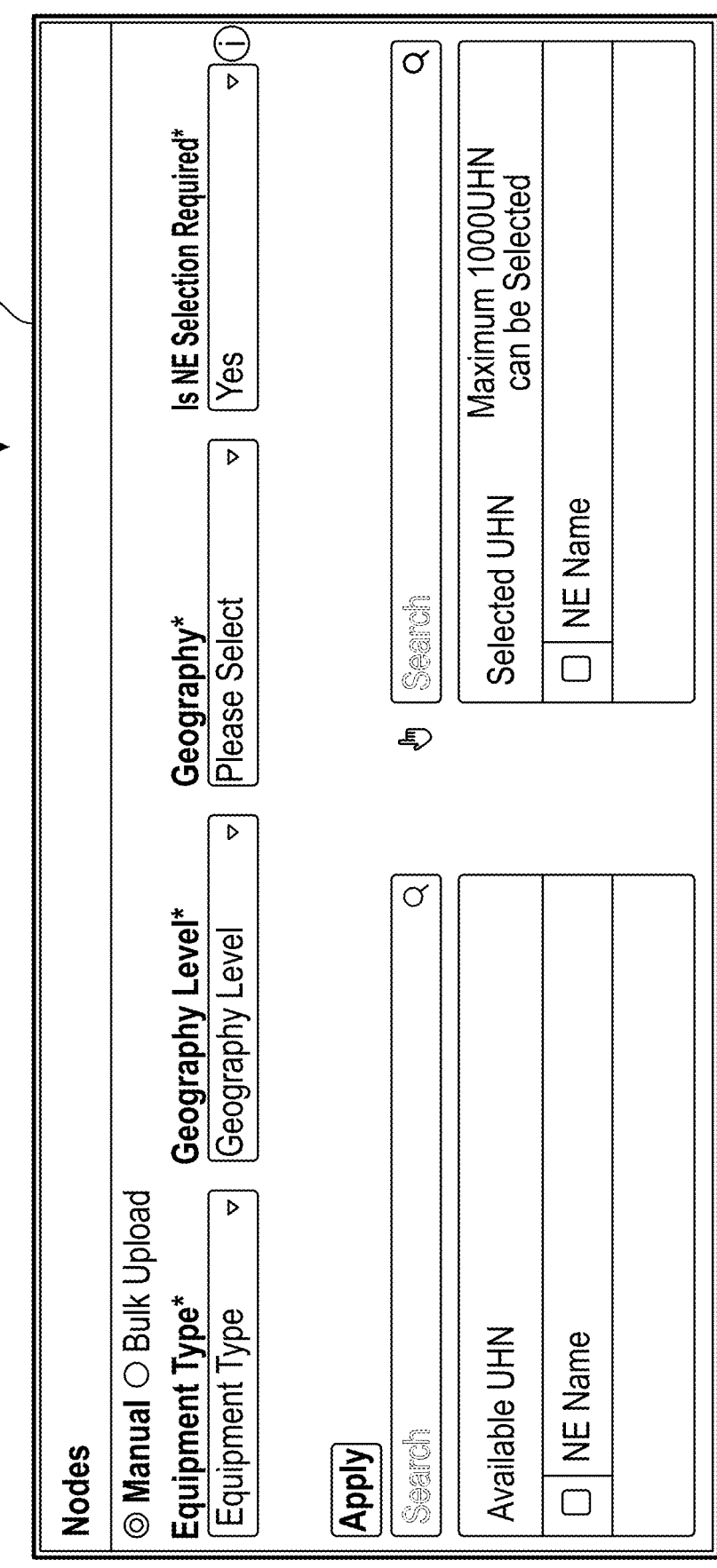
FIG. 4 is a view of a panel in the GUI, in accordance with some embodiments.

FIG. 4 is a view of a panel 400 in the GUI 301, in accordance with some embodiments.

The panel includes visual query options related to defining a node type. The visual query options include visual query options named "Equipment Type," "Geography Level", "Geography," and "Is NE selection required?" The visual query option named "Equipment Type" is configured to receive an equipment type selection such as Cell, RIU, RRH, VCU, VDU. The visual query option named "Geography Level" is configured to receive a geography type selection such as prefecture, city, or RF Cluster. The visual query option named "Geography" is configured to receive a selection of a geographic region, in accordance with whether prefecture, city, or RF Cluster was selected. The visual query option named "Is NE selection required" is configured to receive a selection of Yes or No. Search bars are added so that a user can search any available UHNs associated and selected UHN. Upon receiving one or more of the query selections above, a query builder 152 is configured to generate a query template 129 (See FIG. 1) in accordance with the query selections. In some embodiments, the query builder 152 (See FIG. 1) is configured to generate the query template 129 in accordance with FIG. 2. In some embodiments, the query template 129 is then stored in the non-transitory computer readable storage medium 128 (See FIG. 1) of the cellular network monitoring device 102 (See FIG. 1) or the non-transitory computer readable medium 116 (See FIG. 1) of the database 104 (See FIG. 1).

Figure 5:
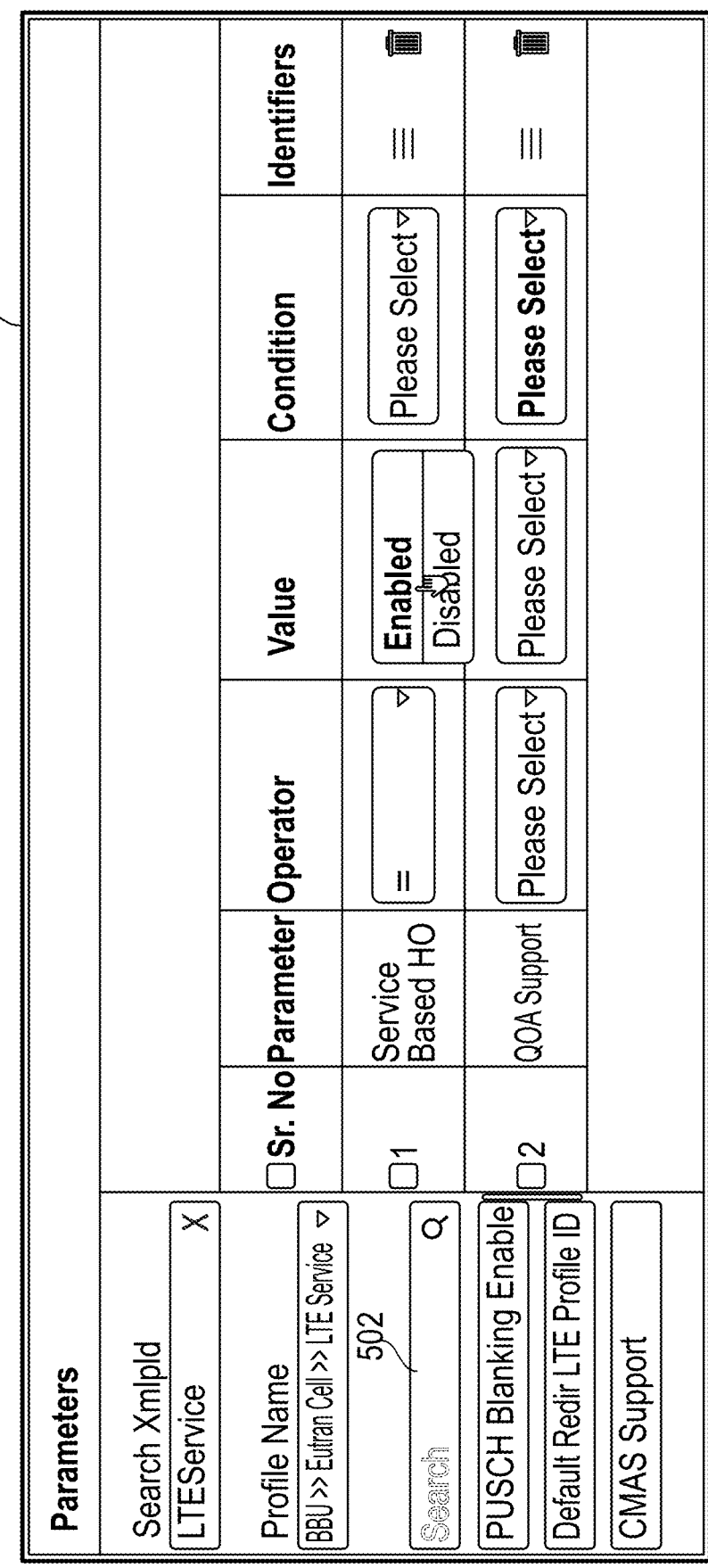
FIG. 5 is a view of a panel in the GUI, in accordance with some embodiments.

FIG. 5 is a view of a panel 500 in the GUI 301, in accordance with some embodiments.

The panel 500 includes visual query options related to the parameters that are to be obtained from the cellular network 106 (See FIG. 1). A entry bar named "Search Xmipid" is configured to receive a network profile selection from a user regarding the NEs. The bar named "Profile Name" displays a profile name for the entry bar selection. A search bar 402 is configured to receive user input defining a portion of the cellular network 106 (See FIG. 1) for receiving the values for the parameters.

A subpanel 502 in the panel 500 includes visual parameter options for defining parameter conditions of the query. For example, the visual parameter options in the subpanel are configured to receive parameter condition selections, such as specific values, value ranges, value limits, value relationships, and/or the like.

Upon receiving one or more of the query selections above, a query builder 152 is configured to generate a query template 129 (See FIG. 1) in accordance with the query selections. In some embodiments, the query builder 152 (See FIG. 1) is configured to generate the query template 129 in accordance with FIG. 2. In some embodiments, the query template 129 is then stored in the non-transitory computer readable storage medium 128 (See FIG. 1) of the cellular network monitoring device 102 (See FIG. 1) or the non-transitory computer readable medium 116 (See FIG. 1) of the database 104 (See FIG. 1).

Figure 6:
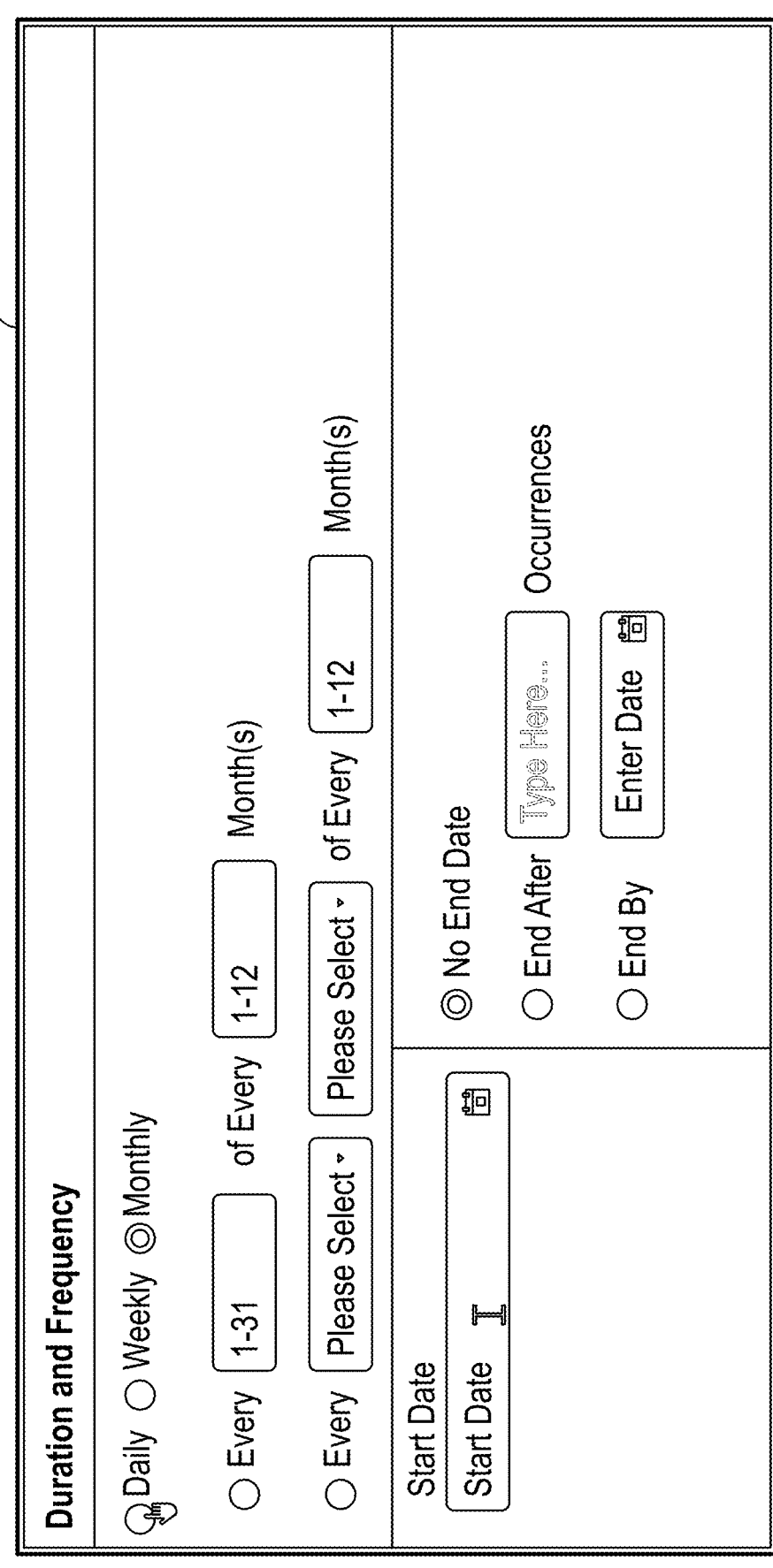
FIG. 6 is a view of a panel in the GUI, in accordance with some embodiments.

FIG. 6 is a view of a panel 600 in the GUI 301, in accordance with some embodiments.

The panel 600 includes visual query options that are visual scheduling options for performing the audit. For example, an audit includes more than one query, in some embodiments. The visual scheduling options are used to generate scheduling data for a query template. The scheduling data defines a query schedule for performing the different queries of the parameters related to the NEs.

The panel 600 includes visual scheduling options named "Daily," "Weekly," "Monthly" so that the user can select between daily, weekly, or monthly reports. When monthly is selected as in FIG. 6, an entry bar is configured to receive what day of the month the query is to occur and to select the number of months between queries (i.e., 1-12). Another entry bar is configured to receive days of the week and the number of weeks between queries, along with the number of months between queries. Another entry bar allows a use to select a start date for the queries and an end date for the queries, including that there be no end date and that the queries continue until further selection ending the query.

Upon receiving the scheduling selections, the query builder 152 (See FIG. 1) is configured to generate scheduling data that defines a query schedule in accordance with the scheduling selections. To perform the audit, the query builder 152 is configured to perform different queries of the parameters related with the NEs 162, 172, 182 (See FIG. 1) of the cellular network 106 in accordance with the query template 129 and in accordance with the query schedule defined by the scheduling data. In some embodiments, a single report is generated with the results of all the queries. In some embodiments, the single report is cumulative and is updated for each query. The single report is transmitted to the user device 190 (See FIG. 1) in every update or once all of the queries are performed. In some embodiments, each report includes a subreport for each of the queries, where each of the subreports is sent to the user device 190 upon completion of each query.

FIG. 7 is a visual representation of a query template 700, in accordance with some embodiments.

The query template is an example of the query template 129 shown in FIG. 1, in accordance with some embodiments.

The data field named "Query Name" has a name for the query template, which in this example is "Example Query." The data field named "Query Type" has a query value of "Database," which indicates that the values of the parameters are historical values to be obtained from the database 104. The data field named "Domain" is configured to identify a domain, which in this example is the RAN. The data field named "Vendor" is configured to identify a vendor, which in this example is Vendor 1. The data field named "Query Category" identifies a query category "New cat." The data field named "Technology" identifies a technology for the query template, which in this example is LTE. The data field named "Site Type" identifies a site type, which in this example is Macro. The data field named "Software Version" is configured to identify a software version, which in this example is R4_2.1. The data field named "Bandwidth" identifies a bandwidth, which in this example is 20 MHz. Data fields are also included for the parameters including the parameter type, which in this example is Service Based HO. Data fields for the parameters also includes an operator field, a value field, and a condition field.

Figure 8:
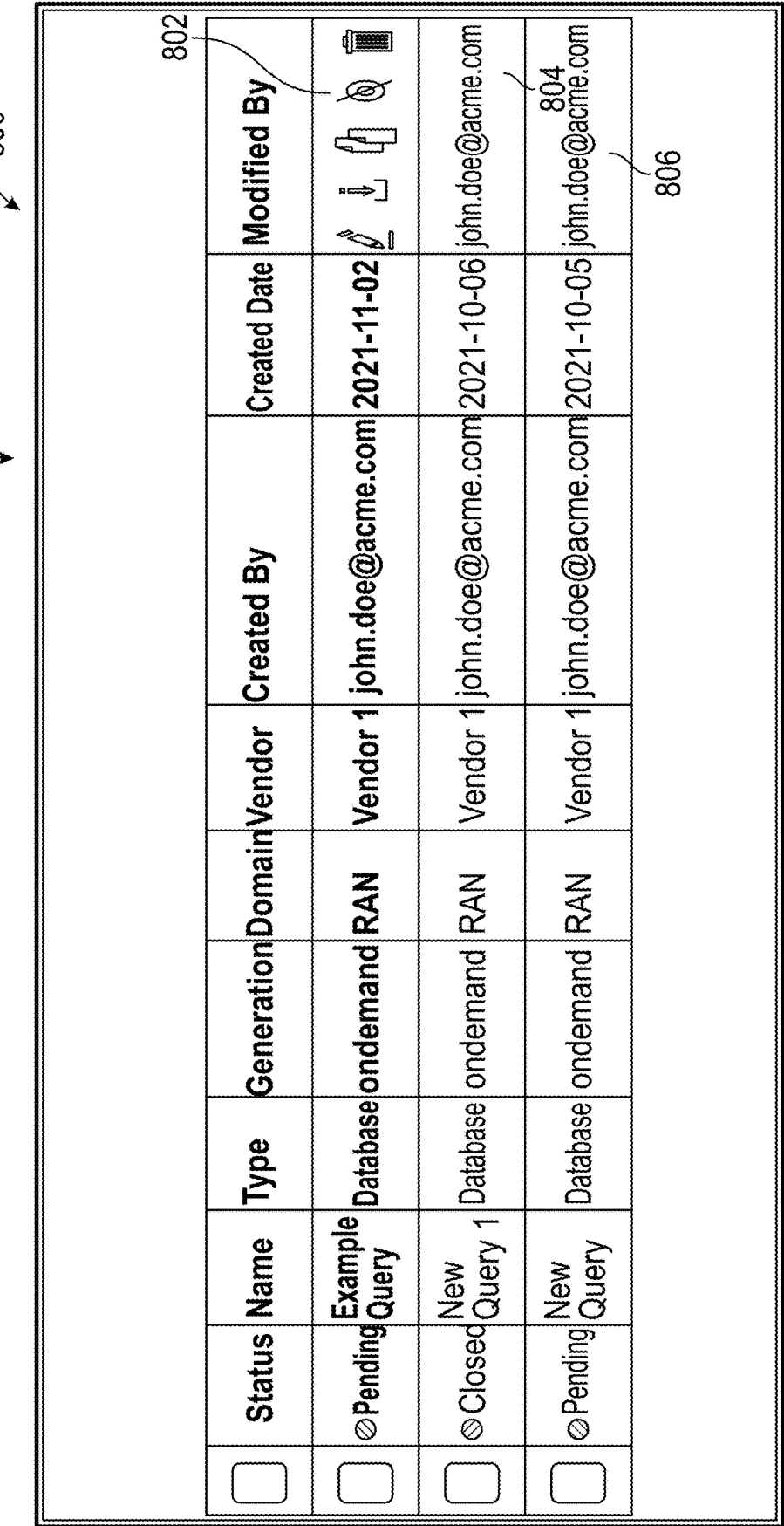
FIG. 8 is a table including different entries for different query templates, in accordance with some embodiments.

FIG. 8 is a table 800 that identifies different entries 802, 804, 806 for different query templates, in accordance with some embodiments.

Each of the entries 802, 804, 806 in the table 800 identifies different query templates that are being implemented by the cellular network monitoring software 127. Each of the entries 802, 804, 806 includes a status identifier, a name, a query type (either live or database), a generation identifier, a domain identifier, a vendor identifier, an identifier that identifies the creator, a creation date, and an identifier that identifies who last modified the query template. Furthermore, there are visual selections in entry 802 that allow the user to implement changes to the query template identified by entry 802 and a reimplementation visual option to reuse the query template to perform another audit.

The status identifier identifies the status of a query with respect to the query template. The status identifier is pending, completed, failed depending on the current condition of the query. In some embodiments, the user selects one of the entries 802, 804, 806 to either modify the query template or to view a report of the audit that results from the query template. Some reports include the results of a single query made with the query template. Other reports include the results of various queries made with the query template. In some embodiments, a set of sub-reports are included in a report wherein each sub-report includes the results of a different query.

FIG. 9 is a visual representation of a report 900 of an audit, in accordance with some embodiments.

The panel includes a visual representation of a report resulting from the audit. The report is an example of the report 112 in FIG. 1. The report 900 includes parameters for the NE named UHN10SK100400163 as a result of the query template 129 in FIG. 1. As shown in FIG. 9, the visual representation in the panel includes fields named "NE Name," "eNode B ID," "Parameter Type," "Equipment Type," "Category," "Parameter," "X Path," and "Current Value." The field named "NE Name" is the name of the NE 162 from which the parameter is captured from. The field named "eNodeB ID" identifies the name of the cell from which the parameter is captured from. The field named "Parameter Type" indicates the type of parameter (including whether the parameter is a Golden parameter). The "Equipment Type" identifies what type of equipment of the NE 162 from which the parameter was captured. The field "Category" identifies the category of the parameter that was captured. The field named "Parameter" indicates the name of the parameter that was captured. The field named "X Path" identifies the routing data for capturing the parameter. The field named "Current Value" indicates the current value of the parameter.

In some embodiments, the queries 150 are request data 110 from past time slots instead of requesting live data. For example, the network element data 110 in FIG. 1 stores historical values for a subset of the parameters associated with one or more NEs 162, 172, 182 in the cellular network 106. As such, queries 150 are transmitted to the database 104 for the past captured values in the network element data 110 of parameters for the NE named UHN10SK100400163. Queries 150 are transmitted to the database 104 to obtain the captured parameter values in the past time slots. In some embodiments, the queries 150 request data 110 that is live and thus is captured in real-time from one or more NEs 162, 172, 182. The visual representation of the report 900 is being shown in the GUI 301.

FIG. 10 is a flowchart 1000 of a method of visualizing data in a cellular network in accordance with some embodiments.

In some embodiments, the flowchart 1000 is implemented by the cellular network monitoring software 127 executed by the cellular network monitoring device 102. Flowchart 1000 includes blocks 1002-1014. Flow begins at block 1002.

At block 1002, visual query options are presented in a GUI, wherein the visual query options are usable to define a query. Examples of the visual query options are shown in panel 300 in FIG. 3, panel 400 in FIG. 4, the panel 500 in FIG. 5, and the panel 600 in FIG. 6. Flow then proceeds to block 1004.

At block 1004, query option selections are received from the GUI. Examples of the query option selections are query option selections of the visual query options shown in panel 300 in FIG. 3, panel 400 in FIG. 4, the panel 500 in FIG. 5, and the panel 600 in FIG. 6. Flow then proceeds to block 1006.

At block 1006, a query template is generated in accordance with the received query option selections. A visual representation of a query template 700 is shown in FIG. 7. Flow then proceeds to block 1008.

At block 1008, an audit of parameters related with network elements of the cellular network in accordance with the query template. Examples of the network elements are NEs 162, 172, 182 and example of the cellular network is the cellular network 106 in FIG. 1. The parameters are in the network element data 110 in FIG. 1 and are generated by the NEs 162, 172, 182. Examples of parameters are shown in FIG. 9. Flow then proceeds to block 1010.

At block 1010, a list is presented that identifies the query template and a status of the audit in the GUI. An example of the list is the list 800 shown in FIG. 8. The list 800 includes the status of Pending and Closed for different query templates. Flow then proceeds to block 1012.

At block 1012, a report is transmitted of the audit to a user device. Examples of reports are the reports 112 in FIG. 1 and the report 900 shown in FIG. 9. Flow then proceeds to block 1014.

At block 1014, a visual representation of the report is presented using the GUI. FIG. 9 illustrates a visual representation of the report 900 in the GUI 301.

FIG. 11 is a flowchart 1100 for reusing a query template to obtain a second report of an audit in accordance with some embodiments.

Flowchart 1100 includes blocks 1102-1110. In some embodiments, flowchart 1100 is implemented after flowchart 1000 in FIG. 10. Flow begins at block 1102.

At block 1102, the query template is stored in a non-transitory computer readable medium. The query templates 129 are stored in the non-transitory computer readable storage medium 128 in FIG. 1. Flow then proceeds to block 1104.

At block 1104, a reimplementation visual option is presented in the GUI. A reimplementation option is presented in the entry 802 of the GUI 301. Flow then proceeds to block 1106.

At block 1106, a reimplementation input of the reimplementation visual option is received from the GUI. Flow then proceeds to block 1108.

At block 1108, the query template is obtained from the non-transitory computer readable medium is obtained in response to receiving the reimplementation input. Flow then proceeds to block 1110.

At block 1110, a second audit of the parameters is performed related with the network elements of the cellular network in accordance with the query template.

Figure 12:
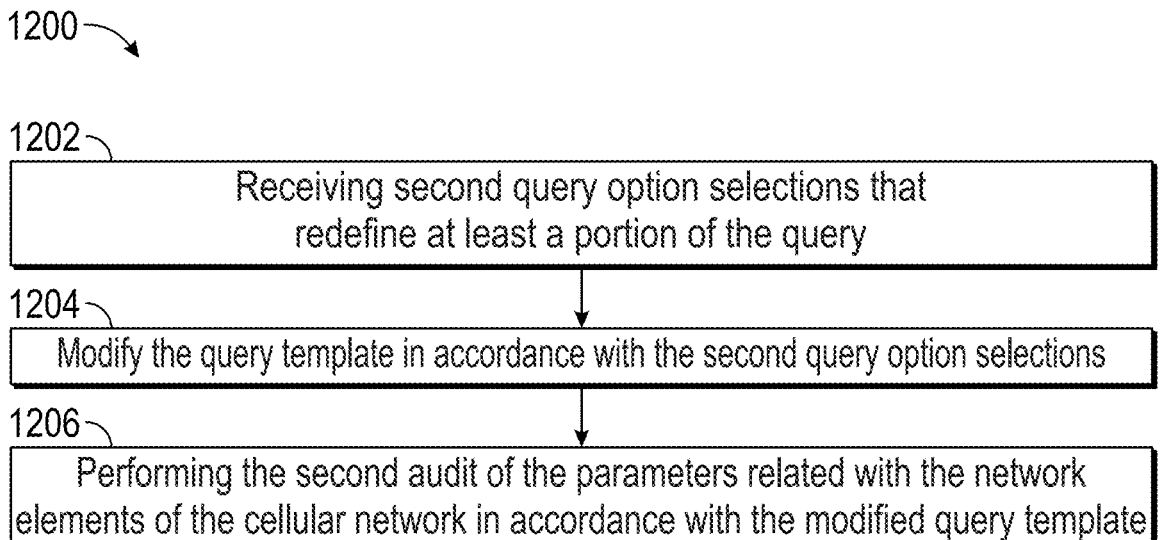
FIG. 12 is a flowchart of a method of updating a query template in accordance with some embodiments.

FIG. 12 is a flowchart 1200 of a method of updating a query template in accordance with some embodiments.

Flowchart 1200 includes blocks 1202-1206. Flow begins at block 1202.

At block 1202, second query option selections that redefine at least a portion of the query are received. In some embodiments, block 1202 occurs prior to block 1104 in FIG. 11. Flow then proceeds to block 1204.

At block 1204, the query template is modified in accordance with the second query option selections. Flow then proceeds to block 1206.

At block 1206, the second audit of the parameters related with the network element of the cellular network is performed in accordance with the modified query template. In some embodiments, block 1206 is an example of block 1110 in FIG. 11.

Figure 13:
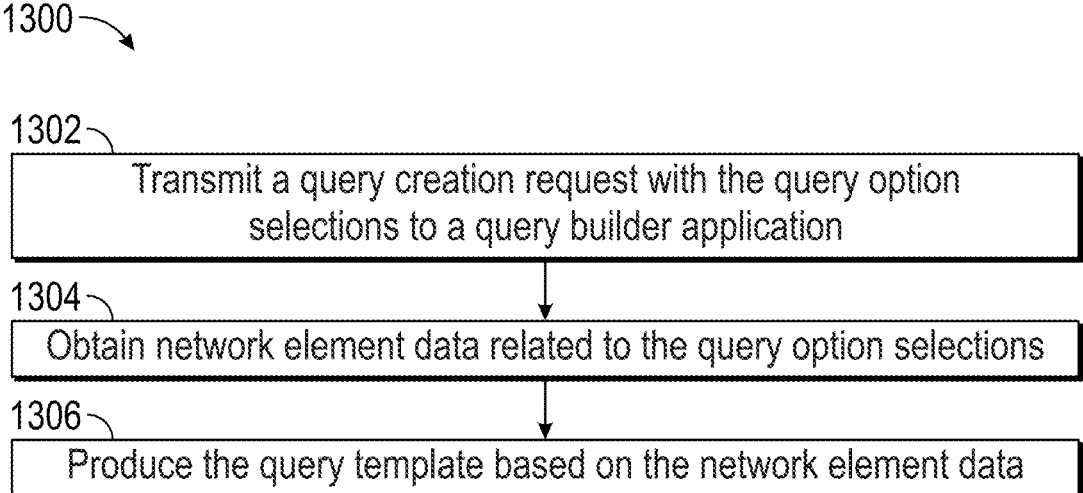
FIG. 13 is a flowchart of a method of generating a query template, in accordance with some embodiments.

FIG. 13 is a flowchart 1300 of a method of generating a query template, in accordance with some embodiments.

Flowchart 1300 includes blocks 1302-1306. At block 1302, a query creation request is transmitted with the query option selections to a query builder application. An example of the query builder application is the query builder 152 in FIG. 1 and the query builder 204 in FIG. 1. An example of block 1302 is block 210 in FIG. 2. Flow then proceeds to block 1304.

At block 1304, the network element data related to the query option selections is obtained. An example of the network element data is the network element data 110 in FIG. 1. An example of block 1304 is block 212. Flow then proceeds to block 1306.

At block 1306, the query template is produced based on the network element data. An example of block 1306 is block 214.

In some embodiments, a method of obtaining data from a cellular network, includes presenting a visual query options in a graphical user interface (GUI), wherein the visual query options define a query; receiving query option selections of the visual query options; generating query template in accordance with the query option selections; performing an audit of parameters related with network elements of the cellular network in accordance with the query template; transmitting a report of the audit to a user device; and presenting visual representations of the report in the GUI. In some embodiments, the visual query options include a visual scheduling option for performing the audit and wherein the receiving query option selections of the visual query options includes receiving a scheduling selection for the visual scheduling options; the generating the query template in accordance with the query option selections includes generating scheduling data that defines a query schedule in accordance with the scheduling selection; and the performing the audit of the parameters related with the network elements of the cellular network in accordance with the query template includes performing different queries of the parameters related with the network elements of the cellular network in accordance with the query template and in accordance with the query schedule defined by the scheduling data. In some embodiments, storing the query template in a non-transitory computer readable medium; presenting a reimplementation visual option in the GUI; receiving a reimplementation input of the reimplementation visual option from the GUI; obtaining the query template from the non-transitory computer readable medium in response to receiving the reimplementation input; performing a second audit of the parameters related with the network elements of the cellular network in accordance with the query template. In some embodiments, prior to the presenting the reimplementation visual option in the GUI, receiving second query option selections that redefine at least a portion of the query;

modifying the query template in accordance with the second query option selections; and wherein the performing the second audit of the parameters related with the network elements of the cellular network is in accordance with the modified query template. In some embodiments, the generating the query template in accordance with the query option selections, includes: transmitting a query creation request with the query option selections to a query builder application; obtaining network element data related to the query option selections; and producing the query template based on the network element data. In some embodiments, the visual query options include a visual geography option that defines a geographical region of the query wherein: the receiving query option selections of the visual query options includes receiving a geographical selection for the visual geography option; the generating the query template in accordance with the query option selections includes generating the query template so that the parameters are related with the network elements that are in the geographic region defined by the geographical selection. In some embodiments, the visual query options include a visual parameter option that defines a parameter condition of the query wherein: the receiving query option selections of the visual query options includes receiving a parameter condition selection for the visual parameter option; the generating the query template in accordance with the query option selections includes generating the query template so that the parameters meet the parameter condition. In some embodiments, presenting a list that identifies the query template and a status of the audit in the GUI.

In some embodiments, a computer device for obtaining data from a cellular network, includes: at least one processor; a non-transitory computer readable storage medium that stores computer executable instructions; wherein, when the at least one processor executes the computer executable instructions, the at least one processor is configured to: present a visual query options in a graphical user interface (GUI), wherein the visual query options define a query; receive query option selections of the visual query options; generate query template in accordance with the query option selections; perform an audit of parameters related with network elements of the cellular network in accordance with the query template; transmit a report of the audit to a user device; and present visual representations of the report in the GUI. In some embodiments, the visual query options include a visual scheduling option for performing the audit and wherein: the receiving query option selections of the visual query options includes receiving a scheduling selection for the visual scheduling options; the generating the query template in accordance with the query option selections includes generating scheduling data that defines a query schedule in accordance with the scheduling selection; and the performing the audit of the parameters related with the network elements of the cellular network in accordance with the query template includes performing different queries of the parameters related with the network elements of the cellular network in accordance with the query template and in accordance with the query schedule defined by the scheduling data. In some embodiments, the at least one processor is further configured to: storing the query template in a non-transitory computer readable medium; presenting an reimplementation visual option in the GUI; receiving a reimplementation input of the reimplementation visual option from the GUI; obtaining the query template from the non-transitory computer readable medium in response to receiving the reimplementation input; performing a second audit of the parameters related with the network elements of the cellular network in accordance with the query template. In some embodiments, the at least one processor is further configured to: prior to the presenting the reimplementation visual option in the GUI, receiving second query option selections that redefine at least a portion of the query; modifying the query template in accordance with the second query option selections; wherein the performing the second audit of the parameters related with the network elements of the cellular network is in accordance with the modified query template. In some embodiments, the at least one processor is configured to generate the query template in accordance with the query option selections by: transmitting a query creation request with the query option selections to a query builder application; obtaining network element data related to the query option selections; producing the query template based on the network element data. In some embodiments, the visual query options include a visual geography option that defines a geographical region of the query and wherein: the receiving query option selections of the visual query options includes receiving a geographical selection for the visual geography option; the generating the query template in accordance with the query option selections includes generating the query template so that the parameters are related with the network elements that are in the geographic region defined by the geographical selection. In some embodiments, the visual query options include a visual parameter option that defines a parameter condition of the query and wherein: the receiving query option selections of the visual query options includes receiving a parameter condition selection for the visual parameter option; the generating the query template in accordance with the query option selections includes generating the query template so that the parameters meet the parameter condition. In some embodiments, the at least one processor is further configured to: presenting a list that identifies the query template and a status of the audit in the GUI.

In some embodiments, non-transitory computer readable storage medium that stores computer executable instructions, wherein, when at least one processor executes the computer executable instructions, the at least one processor is configured to: present a visual query options in a graphical user interface (GUI), wherein the visual query options define a query; receive query option selections of the visual query options; generate query template in accordance with the query option selections; perform an audit of parameters related with network elements of a cellular network in accordance with the query template; transmit a report of the audit to a user device; and present visual representations of the report in the GUI. In some embodiments, the visual query options include a visual scheduling option for performing the audit and wherein: the receiving query option selections of the visual query options includes receiving a scheduling selection for the visual scheduling options; the generating the query template in accordance with the query option selections includes generating scheduling data that defines a query schedule in accordance with the scheduling selection; and the performing the audit of the parameters related with the network elements of the cellular network in accordance with the query template includes performing different queries of the parameters related with the network elements of the cellular network in accordance with the query template and in accordance with the query schedule defined by the scheduling data. In some embodiments, the at least one processor is further configured to: storing the query template in a non-transitory computer readable medium; presenting an reimplementation visual option in the GUI; receiving a reimplementation input of the reimplementation visual option from the GUI; obtaining the query template from the non-transitory computer readable medium in response to receiving the reimplementation input; performing a second audit of the parameters related with the network elements of the cellular network in accordance with the query template. In some embodiments, the at least one processor is further configured to: prior to the presenting the reimplementation visual option in the GUI, receiving second query option selections that redefine at least a portion of the query; modifying the query template in accordance with the second query option selections; wherein the performing the second audit of the parameters related with the network elements of the cellular network is in accordance with the modified query template In some embodiments, the at least one processor is configured to generate the query template in accordance with the query option selections by: transmitting a query creation request with the query option selections to a query builder application; obtaining network element data related to the query option selections; producing the query template based on the network element data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A computer implemented method of obtaining real-time data from a cellular network, comprising:

generating, by a cellular network monitoring device, a graphical user interface (GUI);

transmitting, by the cellular network monitoring device over a network, the GUI to a user device, wherein the GUI presents visual query options to define a query;

receiving, by the cellular network monitoring device over the network, query option selections from the visual query options presented by the GUI;

configuring the cellular network monitoring device to access network elements to capture network element data of a cellular network and to store the network element data in a database;

configuring a query builder application to receive the network element data from the database based on the received query option selections from the visual query options presented by the GUI;

generating, by the query builder application of the cellular network monitoring device, a query template in accordance with the received query option selections;

based on the generated query template, generating, by the cellular network monitoring device, the query for performing an audit of real-time value of parameters of the network elements of the cellular network;

sending requests to edit, delete, enable or disable the query template;

transmitting, by the cellular network monitoring device over the network, the query to the cellular network;

performing the query to obtain the parameters related of the network elements of the cellular network;

in response to performing the query transmitted to the cellular network, receiving, by the cellular network monitoring device over the network, results of the query of the real-time value of the parameters obtained from the network elements of the cellular network;

sending, by the cellular network monitoring device over the network, a request for a status of the query;

transmitting, by the cellular network monitoring device over the network, a report that includes the results of the query to the user device, and the status of the query; and presenting a visual representation of the report, and the status of the query using the GUI.

2. The computer implemented method of claim 1, wherein the transmitting the GUI includes transmitting a visual scheduling option for performing the audit and wherein:

the receiving the query option selections of the visual query options includes receiving a scheduling selection for the visual scheduling option;

the generating the query template in accordance with the received query option selections includes generating scheduling data that defines a query schedule in accordance with the scheduling selection; and the transmitting the query to the cellular network for performing the audit of the real-time value of the parameters of the network elements of the cellular network includes performing different queries of the real-time value of the parameters of the network elements of the cellular network in accordance with the query template and in accordance with the query schedule defined by the scheduling data.

3. The computer implemented method of claim 1, further comprising:

storing the query template in a non-transitory computer readable medium;

transmitting, by the cellular network monitoring device over the network, a reimplementation visual option to the GUI;

receiving, by the cellular network monitoring device over the network, a reimplementation input of the reimplementation visual option from the GUI;

obtaining, by the cellular network monitoring device, the query template from the non-transitory computer readable medium in response to receiving the reimplementation input; and transmitting, by the cellular network monitoring device over the network, a second query to the cellular network for performing a second audit of the real-time value of the parameters of the network elements of the cellular network in accordance with the query template.

4. The computer implemented method of claim 3, further comprising:

prior to the transmitting, by the cellular network monitoring device over the network, the reimplementation visual option to the GUI, receiving second query option selections that redefine at least a portion of the query; and modifying, by the cellular network monitoring device, the query template in accordance with the second query option selections, wherein the performing the second audit of the real-time value of the parameters of the network elements of the cellular network is in accordance with the modified query template.

5. The computer implemented method of claim 1, wherein the generating, by the cellular network monitoring device, the query template in accordance with the query option selections, includes:

transmitting, by the cellular network monitoring device, a query creation request with the query option selections to the query builder application;

obtaining, by the cellular network monitoring device from the database, the network element data related to the query option selections from the database;

configuring the cellular network monitoring device to obtain the network element data from the database and to transmit the network element data to the query builder application, and receiving, by the cellular network monitoring device, the query template from the query builder application based on the network element data obtained from the database.

6. The computer implemented method of claim 1, wherein the presenting the visual query options includes presenting a visual parameter option that defines a parameter condition of the query wherein:

the receiving, by the cellular network monitoring device over the network, the query option selections from the visual query options presented by the GUI includes receiving, by the cellular network monitoring device over the network, the parameter condition selection for the visual parameter option; and the generating, by the cellular network monitoring device, the query template in accordance with the received query option selections includes generating, by the cellular network monitoring device, the query template meeting the received parameter condition selection.

7. The computer implemented method of claim 1, further comprising:

generating, by the cellular network monitoring device, a table that identifies the query template and a status of the audit for presentation in the GUI.

8. The method of claim 1, wherein the presenting the visual query options by the GUI includes presenting a visual geography option that defines a geographical region of the query wherein:

the receiving, by the cellular network monitoring device over the network, the query option selections from the visual query options presented by the GUI includes receiving, by the cellular network monitoring device over the network, a geographical selection for the visual geography option; and the generating, by the cellular network monitoring device, the query template in accordance with the query option selections includes generating, by the cellular network monitoring device, the query template so that the real-time value of the parameters are related with the network elements that are in the geographic region defined by the geographical selection.

9. A computer device including a processor for obtaining real-time data from a cellular network, wherein the processor is configured to:

generate a graphical user interface (GUI);

transmit, over a network, the GUI to a user device, wherein the GUI presents visual query options to define a query;

receive, over the network, query option selections from the visual query options presented by the GUI;

configure a cellular network monitoring device to access network elements to capture network element data of a cellular network and to store the network element data in a database;

configure a query builder application to receive the network element data from the database based on the received query option selections from the visual query options presented by the GUI;

generate, by the query builder application of the cellular network monitoring device, the query template in accordance with the received query option selections;

based on the generated query template, generate, by the cellular network monitoring device, a query for performing an audit of real-time value of the parameters of the network elements of the cellular network;

send requests to edit, delete, enable or disable the query template;

transmit, over a network, the query to the cellular network;

perform the query to obtain the parameters related of the network elements of the cellular network;

in response to performing the query transmitted to the cellular network, receive, over the network, results of the query of the real-time value of the parameters obtained from the network elements of the cellular network;

transmit, over the network, a report that includes the results of the query to the user device; and present a visual representation of the report using the GUI.

10. The computer device of claim 9, wherein the visual query options include a visual scheduling option for performing the audit and wherein:

the receiving the query option selections of the visual query options includes receiving a scheduling selection for the visual scheduling option;

the generating the query template in accordance with the received query option selections includes generating scheduling data that defines a query schedule in accordance with the scheduling selection; and the performing the audit of the parameters of the network elements of the cellular network in accordance with the query template includes performing different queries of the real-time value of the parameters of the network elements of the cellular network in accordance with the query template and in accordance with the query schedule defined by the scheduling data.

11. The computer device of claim 9 further configured to:

store the query template in a non-transitory computer readable medium;

transmit, over the network, a reimplementation visual option to the GUI;

receive, over the network, a reimplementation input of the reimplementation visual option from the GUI;

obtain the query template from the non-transitory computer readable medium in response to receiving the reimplementation input;

transmit, over the network, a second query to the cellular network for performing a second audit of the real-time value of the parameters of the network elements of the cellular network in accordance with the query template.

12. The computer device of claim 11 further configured to:

prior to the transmitting, over the network, the reimplementation visual option to the GUI, receive second query option selections that redefine at least a portion of the query; and modifying the query template in accordance with the second query option selections;

wherein the performing the second audit of the real-time value of the parameters related with the network elements of the cellular network is in accordance with the modified query template.

13. The computer device of claim 9 further configured to generate the query template in accordance with the query option selections by:

transmitting a query creation request with the query option selections to the query builder application;

obtaining, from the database, the network element data related to the query option selections;

configuring the cellular network monitoring device to obtain the network element data from the database and to transmit the network element data to the query builder application, and receiving the query template from the query builder application based on the network element data obtained from the database.

14. The computer device of claim 9, wherein the visual query options include a visual geography option that defines a geographical region of the query and wherein:

the query option selections of the visual query options includes a geographical selection for the visual geography option; and the query template in accordance with the query option selections includes the real-time value of the parameters related to the network elements that are in the geographic region defined by the geographical selection.

15. The computer device of claim 9, wherein the visual query options include a visual parameter option that defines a parameter condition of the query and wherein:

the query option selections of the visual query options include the parameter condition selection for the visual parameter option; and the query template in accordance with the query option selections includes real-time value of parameters that meet the parameter condition.

16. The computer device of claim 9 further configured to:

present a table that identifies the query template and a status of the audit in the GUI.

17. A non-transitory computer readable storage medium that stores computer executable instructions, wherein, in response to execution of the computer executable instructions cause performance of operations to:

generate, by a cellular network monitoring device, a graphical user interface (GUI);

transmit, by the cellular network monitoring device over a network, the GUI to a user device, wherein the GUI presents visual query options to define a query;

receive, by the cellular network monitoring device over the network, query option selections from the visual query options presented by the GUI;

configure the cellular network monitoring device to access network elements to capture network element data of a cellular network and to store the network element data in a database;

configure a query builder application to receive the network element data from the database based on the received query option selections from the visual query options presented by the GUI;

generate, by the query builder application of the cellular network monitoring device, a query template in accordance with the received query option selections;

based on the generated query template, generate, by the cellular network monitoring device, the query for performing an audit of real-time value of parameters of the network elements of the cellular network;

send requests to edit, delete, enable or disable the query template;

transmit, by the cellular network monitoring device over the network, the query to the cellular network;

perform the query to obtain the parameters related to the network elements of the cellular network;

in response to performing the query transmitted to the cellular network, receive, by the cellular network monitoring device over the network, results of the query of the real-time value of the parameters obtained from the network elements of the cellular network;

transmit, by the cellular network monitoring device over the network, a report that includes the results of the query to the user device; and present a visual representation of the report using the GUI.

18. The non-transitory computer readable storage medium of claim 17, wherein the visual query options include a visual scheduling option for performing the audit and wherein:

the receiving the query option selections of the visual query options includes receiving a scheduling selection for the visual scheduling option;

the generating the query template in accordance with the received query option selections includes generating scheduling data that defines a query schedule in accordance with the scheduling selection; and the performing the audit of the real-time value of the parameters of the network elements of the cellular network in accordance with the query template includes performing different queries of the real-time value of the parameters of the network elements of the cellular network in accordance with the query template and in accordance with the query schedule defined by the scheduling data.

19. The non-transitory computer readable storage medium of claim 17 further configured to:

store the query template in a non-transitory computer readable medium;

transmit, by the cellular network monitoring device over the network, a reimplementation visual option to the GUI;

receive, by the cellular network monitoring device over the network, a reimplementation input of the reimplementation visual option from the GUI;

obtain, by the cellular network monitoring device, the query template from the non-transitory computer readable medium in response to receiving the reimplementation input; and transmit, by the cellular network monitoring device over the network, a second query to the cellular network for performing a second audit of the real-time value of the parameters of the network elements of the cellular network in accordance with the query template.

20. The non-transitory computer readable storage medium of claim 19 further configured to:

prior to the transmitting, by the cellular network monitoring device over the network, the reimplementation visual option to the GUI, receiving second query option selections that redefine at least a portion of the query; and modifying, by the cellular network monitoring device, the query template in accordance with the second query option selections;

wherein the performing the second audit of the real-time value of the parameters of the network elements of the cellular network is in accordance with the modified query template; and wherein the generating the query template in accordance with the query option selections includes:

transmitting, by the cellular network monitoring device, a query creation request with the query option selections to the query builder application;

obtaining, by the cellular network monitoring device from the database, the network element data related to the query option selections from the database;

configuring the cellular network monitoring device to obtain the network element data from the database and to transmit the network element data to the query builder application, and receiving, by the cellular network monitoring device, the query template from the query builder application based on the network element data obtained from the database.

* * * * *